United States Patent

Muratov et al.

[11] 3,999,036
[45] Dec. 21, 1976

[54] POWDER-CORED STRIP ELECTRODE FOR SURFACING WITH ABRASION-RESISTANT COMPOSITE ALLOYS

[76] Inventors: Viktor Alexeevich Muratov, prospekt Metallurgov, 23, kv. 28; Valery Vasilievich Chigarev, prospekt Nakhimova, 103, kv. 75; Leonid Solomonovich Malinov, ulitsa Kuprina, 25, kv. 5; Ljudmila Avenirovna Surzhikova, ulitsa 50 let SSSR, 18, kv. 42; Vyacheslav Vasilievich Tarasov, ulitsa Primorskaya, 10, kv. 27; Vladimir Mikhailovich Manov, prospekt Metallurgov, 35, kv. 89; Alexei Afanasievich Kolechko, ulitsa Krasina, 19; Anatoly Vasilievich Zarechensky, ulitsa Ilicha, 139, kv. 23, all of Zhdanov Donetskoi oblasti, U.S.S.R.

[22] Filed: Mar. 7, 1975

[21] Appl. No.: 556,314

[52] U.S. Cl. .................... 219/145; 219/76; 219/146

[51] Int. Cl.² .............................. B23K 35/32

[58] Field of Search ............... 219/145, 146, 76

[56] References Cited

UNITED STATES PATENTS

| | | | |
|---|---|---|---|
| 2,137,471 | 11/1938 | Zublin | 219/145 |
| 2,700,091 | 1/1955 | Culbertsson | 219/146 |
| 3,179,787 | 4/1965 | Wasserman | 219/146 |

Primary Examiner—E. A. Goldberg
Attorney, Agent, or Firm—Lackenbach, Lilling & Siegel

[57] ABSTRACT

A powder-cored strip electrode for surfacing with abrasion-resistant composite alloys, is made up of a metal casing filled with a powdered charge, with said metal casing being made, according to the invention, from copper or a copper-base alloy comprising 0.2–29.5 weight per cent nickel, or from a copper-base alloy containing nickel in combination with 0.3–1.8 weight per cent aluminum and 0.3–13.0 weight per cent manganese, taken separately or in combination, and the powdered charge comprises in weight per cent of the total weight of the electrode tungsten carbides 45–70 with the remaining material being nickel, manganese, magnesium, aluminum, flourinated polymers, titanium and nickelic oxides.

| | |
|---|---|
| tungsten carbides | 45–70 |
| nickel | 0.3–10.5 |
| manganese | 0.5–11.0 |
| magnesium | 0.2–1.0 |
| aluminum | 0.2–1.0 |
| fluorinated polymers | 1.5–3.0 |
| titanium | 0.3–0.6 |
| nickelic oxides | 0.5–1.5 |

6 Claims, 1 Drawing Figure

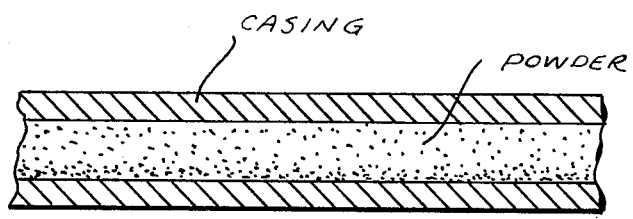

POWDER-CORED STRIP ELECTRODE FOR SURFACING WITH ABRASION-RESISTANT COMPOSITE ALLOYS

BACKGROUND OF THE INVENTION

The present invention relates to surfacing materials and more particularly to powder-cored strip electrodes for use in surfacing with abrasion-resistant composite alloys.

The invention is of particular advantage for hardening the face of parts subject to excessive wear and operating at elevated temperatures under the effect of aggressive medium, or exposed to abrasive or gas-abrasive wear. Thus, the elements of blast furnace charging arrangements: valves, bells, cups, etc, manufactured from various steel grades are subjected in service to such severe wear.

Intensification of the blast furnace process (an increase in gas pressure in blast-furnace tops up to 3 atm.g.p., a rise in air blast temperatures of up to 1000° C, the use of pellets and sinter with high abrasion characteristics as raw materials) causes a sharp increase in the wear of the elements of the charging devices.

To extend the service life of the above-mentioned parts they are given additional strength by applying abrasion-resistant alloys by the arc process. This surfacing practice has found wide use now.

An example of such abrasion-resistant alloys are cobalt-chromium-tungsten-base and nickel-molybdenum-chromium-base doped alloys which came into use in industry.

Abrasion resistance of the above alloys is effected by the presence in their structure of strengthening solid phases. The latter are multiply-doped tungsten and chromium carbides and intermetallics of said elements. The strengthening phases are formed either in the course of crystallization of a homogeneous melt or during heat treatment of the deposited layer. The amount and nature of the strengthening phase depend on the whole range of interrelated physicochemical phenomena, particularly on the solubility limits of alloy components in the metal base of the surfaces abrasion-resistant alloy. The above-mentioned physico-chemical phenomena are practically uncontrollable in the course of surfacing with strengthening alloys and often cause the formation of complex phases enriched with the base metal of a part being hardened, which to a certain extent diminishes abrasion resistance of the deposited layer.

The above-specified doped alloys are applied to parts to be hardened by the mechanized submerged arc process with powder-cored electrodes or solid rods, with the part being preheated to a temperature ranging from 160° to 320° C and maintained at this temperature for the complete time of surfacing.

A main disadvantage of said alloys is their inadequate abrasion resistance, through which the service life of a blast furnace charging cup and bell surfaced with the above alloys amounts, as a rule, to one year and a half or two years for blast furnaces with higher gas pressures of up to 1.5 atm. Another example of the abrasion-resistant alloys is high-chromium iron of the "Sormite-I" type having the following composition, per cent by weight: carbon, 2.2–3.2; chromium, 22–27; silicon, 2.2–3.2; nickel, 2.2–3.2; manganese, 1.7–2.5; iron the balance. The alloys of the Sormite-I type are applied to parts being hardened with the aid of electrode materials in the form of electrodes with a protective coating, powder-cored electrodes or strip electrodes employed for the automatic arc surfacing process (see, e.g. French Pats. No. 2,142,259, the Author's Certificate of the USSR No. 300281). A main disadvantage of the above-mentioned alloy is its brittleness which inevitably causes the formation of a network of cracks in the applied layer which constitute most probable loci of abrasion. Moreover, peculiar to the alloy of the Sormite-I type is deterioration in hardness at elevated temperatures. Thus, at a rise in temperature from 20° to 550° C the Brinell hardness diminishes from 580 to 350 units.

As a result, charging devices hardened with Sormite-I have an inadequate service life ranging within one or one and a half years. Since the operating period of a blast furnace between overhauls amounts to 5–10 years, the losses due to frequent replacement of charging arrangements within that period comes to hundreds of thousands of dollars per furnace.

Composite alloys are to a greater extent free from the above disadvantages, said composite alloys being a composition which consists of a granular abrasion-resistant strengthening phase and a matrix-alloy, and in which, in contrast to the doped alloys, the amount and nature of the strengthening phase is prescribed depending on the requisite abrasion resistance.

A composite alloy is a combination of at least two chemically heterogeneous materials with a boundary therebetween. The composite alloy is formed due to volumetric combination of the above-specified heterogeneous components.

The composite alloy features properties not inherent in its components taken separately.

Known in the art is the composition of such a composite alloy, comprising the strengthening phase — the grains of cast tungsten carbides, and matrix-alloy of the following composition (weight per cent): nickel, 19–20; manganese, 18–20; iron, up to 1; copper, the balance (see, e.g. GDR Pat. No. 79408). In the above alloy the grains of the strengthening phase may range from 0.18 to 2.0 mm in cross-section, their volume concentration varying usually within 45–70%.

A combination of high hardness of the cast tungsten carbide grains approximating that of diamonds, with high strength and ductility of the above-mentioned copper-base matrix-alloy ensures high abrasion resistance of the known composite alloy.

The composite alloy of the above-specified composition was applied to the valves, cups and bells of blast furnace charging arrangements (see a magazine "Metallurgist" No. 1, 1973). Their service life was 3 to 4 times as great as that of similar parts surfaced with the alloy of the Sormite-I type.

The elements of blast furnace charging arrangements were surfaced with the above-described composite alloy with the aid of a mould which was welded to the part being surfaced so that a clearance of a preset size was formed therebetween, with the size corresponding to the thickness of the applied layer. The clearance was filled with granular tungsten carbide rammed down by a tamper. The matrix-alloy in the form of metal castings was placed in a special hopper above the strengthening phase. Next the surfacing zone was sealed by welding the mould and part together with a tight weld whereupon they were placed into a furnace where they were heated to a temperature of 1200° C without the access of oxygen from ambient air. At the above temperature the matrix-alloy melted, ran down and wetted the grains of the tungsten carbide and the surfaces of the part and mould. The part being hardened and the mould were held at the above temperature for 1–3 hours and then cooled in the furnace.

When surfacing the bell and the cup the duration of the technological cycle was equal to about 48 hrs. The subsequent aging of the deposited layer was effected at a temperature of 400°–450° C and lasted 20–40 hours.

The mould was removed from the finished part by machining with the help of a cutter, and the part contact zone was ground to required geometrical size.

A comparatively low temperature of the surfacing process allows maintaining in the deposited layer the prescribed concentration of the strengthening phase which retains its physicochemical properties. In this case the base metal of the part is not melted which ensures the preservation of prescribed characteristics of the composite alloy.

However, the use of this method, referred to hereinafter as the furnace surfacing technique, is limited by the process temperature which in surfacing steel parts should not exceed 1200° C. This is a limitation restricting the selection of the composite alloys, since the melting points of their matrix-alloys must not exceed the above-specified temperature of the surfacing process.

Other disadvantages of the above-disclosed method involve a complicated and labour-consuming technique which calls for the complete sealing of the surfacing zone.

Moreover, inherent in the above-outlined furnace surfacing technique is a high power input which is attributable to the need in heating heavy metal masses (about 25–50 t). The specific power consumption per 1 kg of the deposited metal varies from 75 to 150 kWhr/kg. Another disadvantage resides in high metal consumption which can be put down to single-application metal moulds. The need for unique heat-treating equipment can be also considered as one of the disadvantages of the above method.

Mechanized surfacing with the strengthening alloys by the arc process is free from the above disadvantages of the furnace surfacing procedure with the use of additional moulds.

However, owing to the lack of adequate electrode materials surfacing by the arc welding process did not find wide industrial application for hardening parts with composite alloys. Thus, known in the art is a tubular electrode for surfacing with a composite alloy, said electrode comprising a protective coating which is a steel casing shaped as a tube, and a powdered mixture or charge which contains tungsten carbides, nickel and manganese, the weight percentage of the components being as follows: nickel, 4–5; manganese, 1–1.5; tungsten carbides, the balance (see, e.g., Author's Certificate of the USSR No. 390899).

As regards the use of the above-described electrode with a protective coating for surfacing with composite alloys, it should be noted that it suffers from a number of serious disadvantages.

A main disadvantage of the known electrode lies in that surfacing is associated with a partial or complete dilution of the strengthening phase — tungsten carbides — in molten metal of the electrode steel casing. This is attributable to a high melting point of the iron-base matrix-alloy under the conditions of surfacing by the arc process. It results in a reduction in the preset concentration of the strengthening phase and in a change in the composition of the matrix-alloy caused by the dilution of the tungsten carbides in steel. The structures formed in this case vary from tungsten steel to iron with a considerable amount of secondary tungsten-ferrous carbides. Said structures feature an enhanced brittleness and show a tendency toward cracking the spalling of the strengthening layer built-up with the above-described electrode which diminishes abrasion resistance of parts being hardened.

Moreover, the use of the protective coating for the above electrode precludes mechanization of the surfacing process, and the removal of a slug crust formed on the applied hard face calls for additional technological operation.

SUMMARY OF THE INVENTION

The main object of the invention is to provide an electrode material for surfacing with composite alloys comprising a strengthening phase — tungsten carbides, and a matrix-alloy, said material ensuring the preservation on a deposited layer of preset concentrations and physicochemical properties of the strengthening phase and the strength and ductility of the matrix-alloy.

Another object of the invention is the provision of an electrode material allowing surfacing with an open arc without special gas or flux protection.

Still another object of the invention is to provide an electrode material which would make it possible to mechanize and automatize surfacing with a composite alloy.

Yet another object of the invention is to provide an electrode material enabling a composite alloy to be applied without the preliminary and concomitant heating of a part being hardened.

Said and other objects are achieved by providing and applying a powder-cored strip electrode for surfacing with abrasion-resistant composite alloys, said electrode being made up of a metal casing filled with a powdered charge, with the above metal casing being produced from copper, a copper-base alloy containing nickel, a copper-base alloy containing nickel in combination with aluminum or from a copper-base alloy containing nickel in combination with manganese, or from a copper-base alloy containing nickel in combination with aluminum and manganese, and the powdered charge comprises the following ingredients taken in weight per cent of the total weight of the powder-cored strip electrode:

| | |
|---|---|
| tungsten carbides | 45–70 |
| nickel | 0.3–10.5 |
| manganese | 0.5–11.0 |
| magnesium | 0.2–1.0 |
| aluminum | 0.2–1.0 |
| fluorinated polymers | 1.5–3.0. |

In a preferred embodiment of the present invention a powder-cored strip electrode has a metal casing produced, according to the invention, from a copper-base alloy comprising 0.2–29.5 weight per cent nickel in combination with the following metals: aluminum, 0.3–1.8 weight per cent and manganese, 0.3–13 weight per cent, taken separately or in combination, and the powdered charge incorporates, apart from the above-specified components, titanium amounting to 0.3–0.6 weight per cent of the total weight of the powder-cored electrode and nickelic oxides amounting to 0.5–1.5 weight per cent of the total weight of the powder-cored strip electrode.

In case the herein-proposed powder-cored strip electrode is employed for hardening the elements of blast furnace charging arrangements, it is good practice to choose the composition of the powder-cored strip electrodes depending on the service conditions of a part being surfaced.

Thus, for applying a composite alloy to the contact surfaces of a bell and cup in a blast furnace charging arrangement operating under the conditions of gas-abrasive wear at a temperature of 400–600° C, it is sound practice to use a powder-cored strip electrode in which, according to this invention, the metal casing is fabricated from a copper-base alloy comprising 20.5 weight per cent nickel in combination with 0.3 weight per cent aluminum and 13 weight per cent manganese, and the powdered charge incorporates the following ingredients taken in weight per cent of the total weight of the powder-cored strip electrode: tungsten carbides, 67.0; nickel, 0.3; manganese, 2.5; magnesium, 0.5; aluminum, 0.5; titanium, 0.4; fluorinated polymers, 2.5; nickelic oxides, 1.0.

When applying a composite alloy for hardening the protective zone of a cup and bell operating under more mild conditions of impact loading and abrasive wear, it is expedient that the powder-cored strip electrode be used, wherein, according to the invention, the metal casing is produced from a copper-base alloy containing 5.5–6.5 weight per cent nickel in combination with 1.2–1.8 weight per cent aluminum and 0.5–1.0 weight per cent manganese, and powdered charge comprises the following ingredients taken in weight per cent of the total weight of the powder-cored strip electrode: tungsten carbides, 65–70; nickel, 0.3–3.0; manganese, 0.5–0.8; magnesium, 0.2–1.0; aluminum, 0.2–1.0; titanium, 0.4–0.5; fluorinated polymers, 1.5–2.0, nickelic oxides, 0.5–1.0.

Such powder-cored strip electrodes are highly efficient economically, since they contain a comparatively small amount of nickel of about 6.5%.

The powder-cored strip electrode, according to the invention, ensures the formation in the applied layer of abrasion-resistant composite alloys, in which granular tungsten carbides are present in a prescribed concentration and which retain their original physicochemical properties.

In surfacing by the arc process all the components of the powder-cored strip electrode — the powdered charge (with the exception of tungsten carbides) and metal casing — are completely melted. This allows obtaining in the deposited layer a composite alloy structure comprising a strengthening phase — granular tungsten carbide, and a matrix-alloy in which the above-mentioned strengthening phase is dispersed. The volume concentration of the tungsten carbides in the deposit ranges with 40–65% which provides high abrasion resistance of the composite alloy exceeding by 3–5 times that of the doped alloy of the Sormite-I type.

The strengthening phase — tungsten carbides — are dispersed in the bulk of the matrix-alloy of the following composition, weight per cent (taking into account the dilution with the part base metal): nickel, 3.0–30.0; manganese, 1.0–25.0; aluminum, 0.03–3.0; magnesium, 0.02–0.08; titanium, 0.03–0.18; iron, 1.0–5.0; copper, the balance.

The use of the powder-cored strip electrode, according to the invention, makes it possible to mechanize and automate the surfacing process by using the known surfacing equipment widely employed in industry (e.g., surfacing outfits developed by the Paton Electric Welding Institute). The rates of deposition on in this case range with in 28–60 kg of the deposited composite alloy per hour (depending on a current regime), exceeding by 3–5 times the yield of the known surfacing procedures.

The composition of the powdered filler, proposed according to the invention, affords a possibility of surfacing with an open arc without protecting the zone of a molten alloy with a flux or gas, with the applied layer of the composite alloy being free from discontinuities and pinholes.

According to the invention, the matrix-alloy of the composite alloy features high ductility characterized by an elongation of about 35–55% after surfacing (at a temperature of 20° C). Therefore the composite alloy can be applied without preliminary and concomitant heating of a part, and the deposited metal is free from cracks and spalling.

The powder-cored strip electrode for surfacing with the composite alloys, according to the present invention, affords the possibility of surfacing with low specific power consumption of about 1.2–2.3 kWhr/kg of the deposited composite alloy which corresponds to a 50–100 fold decrease as compared with the known furnace surfacing technique.

The powder-cored strip electrode, according to this invention, makes it possible to produce a well-shaped deposit without high variations in the hard face level. Moreover, surfacing is done with minimum spattering and loss of the strip electrode material. The consumption of the strip electrodes varies from 1.15 to 1.2 kg per 1 kg of the deposited composite alloy.

Other advantages and merits of this invention will become apparent from the reading of the following detailed specifications.

BRIEF DESCRIPTION OF THE DRAWING

The single Figure is a fragmented cross-sectional view of a powder-cored strip electrode in accordance with the present invention, taken generally along the parting line of the tubular casing, and showing an electrode casing and its powdered filler core.

DESCRIPTION OF THE PREFERRED EMBODIMENT

Referring to the single Figure, in surfacing with composite alloys by the arc process and by using the herein-proposed powder-cored strip electrodes the molten metal of the electrode casing and its powdered filler are inevitably interacting with the atmosphere of an electric arc and with the base metal of a part being surfaced. This interaction may cause the dilution of the strengthening phase, loss of the alloy elements and enrichment of molten metal with harmful impurities: oxygen, carbon, sulphur and hydrogen.

In surfacing with composite alloys any changes in chemical and phase compositions adversely affect the abrasion resistance of these alloys. According to the invention, the preset composition and structure of the composite alloy in the deposited metal are achieved by proper selection and combination of the compositions of the metal casing and powdered filler of the strip electrode.

As for the metal from which the casing of the strip electrode is made, according to this invention, copper or copper-base alloys with such dopants as nickel, manganese and aluminum have been chosen.

In the known electrode materials with steel casings the tungsten carbides are completely or partially dissolved in he course of surfacing causing embrittlement of the applied layer. By contrast, the copper-base alloys containing nickel, manganese and aluminum, in surfacing by the arc welding process at a temperature of a weld pool of 1250°–1350° C actually do not interact with the strengthening phase — the tungsten carbides. On the other hand, they are capable of wetting adequately the tungsten carbides whereby the strengthening phase is reliably fixed in the matrix-alloy. At the same time it provides adequate weldability of the applied layer with a steel part.

The selected dopants: nickel, manganese and aluminum, permit obtaining a copper-base alloy featuring high strength and plastic characteristics.

In case the metal casing is produced from copper or copper-base alloys with dopant contents insufficient to obtain in the applied composite alloy the matrix-alloy of a requisite composition, the deficient dopants are introduced into the composition of the powdered charge. Naturally, the content of the tungsten carbides in the charge and, hence, the amount of the strengthening phase in the deposited composite alloy and, consequently, the abrasion resistance of this alloy diminish as a result.

The upper limit of the dopant content in the copper-base alloy is limited by a decrease in the ductility of the above alloy which complicates the fabrication of the metal casing of the powder-strip electrode.

The preferred composition of a copper-base alloy, containing nickel in combination with manganese and aluminum, for the manufacture of metal casings for strip electrodes is (weight per cent): nickel, 0.2–29.5; aluminum, 0.3–1.8; manganese, 0.3–13.0.

To obtain a deposit having the structure of the composite alloy with high volume concentration of the strengthening phase, the matrix-alloy of a prescribed composition, to provide metallurgical protection of the melting zone, adequate moulding of the deposit and to avoid defects in the deposited metal (pinholes, cracks), use is made of a strip powder-cored electrode with the above-specified metal casing filled with a powdered charge comprising tungsten carbides, nickel, manganese, aluminum, magnesium, titanium, fluorinated polymers and nickelic oxides.

The strengthening phase of the composite alloys — the tungsten carbides — is introduced into the filler composition, according to the invention, in amounts ranging from 45 to 75 weight per cent to provide high abrasion resistance of the composite alloys.

The upper limit of 70 weight per cent is determined by the technological possibilities of obtaining the requisite structure of the composite alloy under the conditions of surfacing by the arc welding process. If the above limit is exceeded, the amount of tungsten carbides not wetted with the matrix-alloy will increase. This leads to deterioration of performance characteristics of the deposited composite alloy, being in addition economically impractical.

Tungsten carbide contents of less than 45 weight per cent does not provide a requisite abrasion resistance of the composite alloy.

The use of 0.3–10.5 weight per cent nickel in the powdered charge enhances the strength characteristics of the deposited composite alloy due to the hardening of the matrix-alloy and to the formation in combination with other dopants of intermetallics, such as $Ni_3Al$, $NiAl$. With the metal casing containing 29.5 weight percent nickel, it is sufficient to introduce 0.3 weight percent Ni into the charge to compensate for its losses due to oxidation and spattering during hard facing.

With the metal casing comprising lower amounts of nickel — 0.2 per cent by weight, it should be introduced into the powdered charge in greater amounts, maximum nickel contents in the charge being limited by 10.5 weight per cent.

Greater amounts of nickel in the powdered charge promote the dilution of a considerable quantity of hydrogen and carbon in the matrix-alloy with the ensuing embrittlement thereof. Moreover, nickel contents exceeding the above-specified limits contributes to the dilution of iron in the steel base of parts being hardened and this, in turn, leads to higher dilution of tungsten carbides diminishing materially the abrasion resistance of the applied composite alloy.

Manganese, whose contents in the powdered charge varies from 0.5 to 11.0 weight per cent, improves mechanical properties and heat resistance of the matrix-alloy. In the meantime it neutralizes the harmful effects of sulphur and eliminates brittleness of the alloys containing carbon. Manganese is also a good deoxidizer.

With manganese contents in the metal casing of about 0.3 weight per cent, a decrease in its content in the charge below 0.5 weight per cent does not provide the binding of sulphur into insoluble high-melting compounds.

With the manganese content in the charge exceeding its top limit, i.e. 11 weight per cent, and with the metal casing containing 0.3 weight per cent manganese, the ductility of the matrix-alloy is substantially decreased which adversely affects abrasion resistance of the applied composite alloy.

Moreover, higher manganese contents deteriorate sanitary conditions of the surfacing process.

Aluminum is introduced into the filler in amounts of 0.2–1.0 weight per cent to prevent oxidation of the matrix-alloy at elevated temperatures due to the formation of dense protective films on its surface.

Moreover, aluminum promotes the hardening of the matrix-alloy due to the formation of intermetallics. It exerts also a favourable influence on welding-and technological characteristics of the powder-cored strip electrode contribution, as a degasser, to the production of tight sound welds free from pinholes.

Aluminum contents in the powdered charge of less than 0.2 weight per cent have an insignificant influence on the proper-ties of the matrix-alloy.

An increase in its contents in the powdered charge above its upper limit of 1 weight per cent with aluminum contents in the casing of 1.8 weight per cent causes embrittlement of the matrix-alloy.

Magnesium is introduced into the filler composition in amounts of from 0.2 to 1.0 weight per cent to eliminate harmful effect of sulphur by binding it into high-melting-point insoluble compounds MgS. Magnesium ensures also excellent welding-and-technological properties of the powder-cored strip electrodes. It promotes adequate degassing of the deposited composite alloy and enables the production of tight nonporous welds. Magnesium enhances heat resistance of the matrix-alloy and prevents its oxidation at elevated temperatures due to the formation of dense films of MgO. With magnesium contents of less than 0.2 weight per cent it does not ensure adequate binding of sulphur. When it is taken in amounts greater than 1 weight per cent it adversely affects the moulding of welds owing to intense spattering during the surfacing operation.

Titanium is introduced into the charge of the powder-cored strip electrodes in amounts of 0.3–0.6 weight per cent, according to the invention, to enhance plastic properties of the deposit in a brittleness temperature range of 400°–600° C. Titanium binds hydrogen into stable hydrides precluding thereby the appearance of cracks and spalling of the deposited composite alloy. Titanium contributes to the hardening of the matrix-alloy during heat treatment due to the formation of intermetallics of the NiTI, $Ni_3Ti$ type. With titanium contents in the powdered charge of less than 0.3 weight per cent, no enhancement of plastic properties of the matrix-alloy in the brittleness temperature range is observed. When the amount of titanium in the charge exceeds its upper limit (0.6 weight per cent), the moulding of the deposited composite alloy deteriorates considerably and causes spattering during surfacing.

The use in the powdered charge of 1.5–3.0 weight per cent of fluorinated polymers provides adequate thermal protection of the granular tungsten carbides against thermal effect of a weld arc. It provides also for their transition into the deposited metal without any alteration of their original properties. This is attributable to low heat conductivity and high arc resistance of the fluorinated polymers, The heat passage coefficient of fluorinated polymers is equal to $(5.4–6.0) \cdot 10^{-4}$ cal/cm.s.deg. and their arc resistance amounts to 250 s. In the meantime the fluorinated polymers during their thermal destruction ensure metallurgical protection of the melting zone by binding hydrogen from the arc atmosphere into stable hydrogen fluoride compounds insoluble in molten metal. Moreover, the decomposition product of fluorinated polymers — carbon — is an active deoxidizer and when burning it creates an additional gas shield for molten metal. Therefore surfacing with the herein-proposed powder-cored strip electrodes can be done without any protection whatever, with gas or flux. Fluorinated polymer contents in the charge of less than 1.5 weight per cent causes pinholes in the deposit owing to inadequate protection of the melting zone from air. If, on the contrary, fluorinated polymer contents in the charge exceeds its upper limit of 3 weight per cent, carbon concentration in the matrix-alloy increases above the permissible value of 0.05 weight per cent which causes embrittlement of the applied composite alloy.

The introduction into the charge of 0.5–1.5 weight per cent nickelic oxides, according to the invention, serves to reduce the losses of electrode metal with spatters in the course of surfacing. Moreover, it promotes additional removal of hydrogen from molten metal due to the boiling of a weld pool.

With the nickelic oxide contents in the powdered charge of less than 0.5 weight per cent, i.e. below their lower limit, their favourable effect on spattering is not observed but the moulding of the deposited layer deteriorates in that case. The upper limit for nickelic oxide contents in the charge amounting to 1.5 weight per cent is determined by the permissible concentration of oxygen in the matrix-alloy and nickelic oxide contents of over 1.5 weight per cent may cause cracks in the deposit.

The above-specified compositions of the metal casing and powdered charge of a powder-cored strip electrode, according to the invention, make it possible to obtain an abrasion-resistant alloy comprising up to 65 volume per cent of the strengthening phase — tungsten carbides — dispersed in the bulk of the matrix-alloy of the following composition, weight per cent (with due account for the dilution in the base metal): nickel, 3.0–30.0; manganese, 1.0–25.0; aluminum, 0.03–3.0; magnesium, 0.02–0.08; titanium, 0.03–0.18; iron, 1.0–5.0; copper, the balance.

Wide ranges adopted for dopant contents in the composition of the matrix-alloy allow obtaining abrasion-resistant composite alloys featuring different strength characteristics and meeting a wide range of specifications for articles operating under forcing technological conditions.

Thus, for hardening parts operating at high temperatures of about 400°–600° C and exposed to gas-abrasive wear which causes deterioration of the strength properties of the matrix-alloy, it is expedient that the composite alloy be used with the matrix-alloy having the following composition, weight per cent (taking into account the dilution in the base metal of a part being hardened): nickel, 19–20; manganese, 19–20;0 aluminum, 0.05–0.2; magnesium, 0.02–0.03; titanium, 0.05–0.1; iron, 1.0–1.5; copper, the balance. Such a matrix-alloy has excellent strength and plastic characteristics, and after heat treatment its hardness (Rockwell, scale C — HRC) varies from 30 to 32 units. In combination with the strengthening phase-tungsten carbides (whose hardness HRA amounts to 90) the above matrix-alloy forms an abrasion-resistant composite alloy featuring the whole range of high physicomechanical properties.

The aforesaid composite alloy is obtainable in surfacing with a powder-cored strip electrode in which the metal casing, according to the invention, is manufactured from a copper-base alloy containing 20.5 weight per cent nickel in combination with 0.3 weight per cent aluminum, 13 weight per cent manganese, and powdered charge comprises the following ingredients, taken in weight per cent of the total weight of the powder-cored strip electrode; tungsten carbides, 67.0; nickel, 0.3; manganese 2.5; magnesium, 0.5; aluminum, 0.5; titanium, 0.4; fluorinated polymers, 2.5; nickelic oxides, 1.0.

For hardening parts operating under less severe conditions than the above-outlined, it is advisable that the composite alloy be applied with the powder-cored strip electrode having less nickel, the strip electrode being therefore more economical.

Thus, when applying an abrasion-resistant composite alloy with a powder-cored strip electrode in which, according to the invention, its metal casing is made from a copper-base alloy containing from 5.5 to 6.5 weight per cent nickel in combination with 1.2–1.8-weight per cent aluminum and 0.5–1.0 weight per cent manganese, and the powdered charge comprises the following ingredients taken in weight per cent of the total weight of the powder-cored strip electrode; tungsten carbides, 65–70; nickel, 0.3–3.0; manganese, 0.5–0.8; magnesium, 0.2–1.0; aluminum, 0.2–1.0; titanium, 0.4–0.5; fluorinated polymers, 1.5–2.0; nickelic oxides, 0.5–1.0; the composite alloy being formed comprises up to 56–65 volume per cent of the strengthening phase — the tungsten carbides dispersed in the matrix-alloy of the following composition (with due allowance for dilution with iron from a part being surfaced), weight per cent: nickel, 5–6; manganese, 0.6–1.0; magnesium, 0.02–0.03; aluminum, 1.5–1.8; titanium, 0.04–0.07; iron, 1.0–1.5; copper, the balance.

High volume concentration of the tungsten carbides as well as high mechanical characteristics of the matrix-alloy (impact toughness of about 12 kgm/cm$^2$ and strength — 65 kg/mm$^2$) after heat treatment ensure adequate operability of the composite alloy under the conditions of impact loading and abrasive wear.

In putting the invention into practice possible objectionable impurities in the composition of a matrix-alloy should be taken into consideration.

Such objectionable impurities adversely affecting the strength characteristics of the composite alloy include sulphur, oxygen, hydrogen, carbon, bismuth, antimony and lead.

Bismuth, antimony and lead deteriorate the properties of copper-base alloys and impede their plastic working when manufacturing metal casings for powder-cored strip electrodes. Their contents in a copper-base alloy should be less than, weight per cent: bismuth, 0.002; antimony, 0.005 and lead, 0.005.

Sulphur also ranks among harmful impurities in copper-base alloys and its contents must not exceed 0.01 weight per cent With copper and nickel sulphur forms eutectics, such as Cu+CuS$_2$, Ni+Ni$_3$S$_2$ which segragate on the boundaries of tungsten carbide grains and embrittle the composite alloy.

Limitations to oxygen contents (not over 0.02 weight per cent of copper-base alloys are attributable to its ability to cause "hydrogen embrittlement". At high temperatures hydrogen from ambient air interacts with oxygen of cuprous or nickel oxides, present in the matrix-alloy, and forms water vapours destroying the alloy.

Moreover, metal oxides on being crystallized may form eutectics of the Cu+Cu$_2$O or Ni+NiO type also embrittling the composite alloy.

Carbon also belongs to harmful impurities since with carbon contents exceeding the solubility limit, i.e. 0.04–0.05 weight per cent, technological properties of the matrix-alloy deteriorate.

The proposed powder-cored strip electrode can be produced by any known method, preferably by using the technique and apparatus developed by the Paton Electric Welding Institute.

According to the invention, the powder-cored strip electrode comprises a metal casing, for example, rectangular in cross-section, and preferably of two halves, an upper and lower ones, and a powdered filler uniformly packed into the inner space of the metal casing.

The powdered charge components; nickel, manganese, magnesium and aluminum, can be employed in the form of either pulverized pure metals or pulverized alloys. Thus, preference should be given to the introduction into the composition of a powdered charge of pulverized aluminum-magnesium alloy with the component ratio of 1:1.

Said powders, including nickelic oxides and fluorinated polymers, should be preferably employed in the form of fractions passing through a 0.056 mm sieve mesh.

Cast grains of tungsten carbide should preferably vary in size from 0.18 to 2.0 mm. The amount of coarse fraction with grains sizing 0.7–2.0 mm should amount to 70 weight per cent and that of a fine fraction with grains sizing 0.18–0.7 mm to 30 weight per cent.

The above-listed components of the powdered charge are taken in amounts ensuring their presence in the powder-cored strip electrode in the following percentage (by weight):

| | |
|---|---|
| tungsten carbides | 45–70 |
| nickel | 0.3–10.5 |
| manganese | 0.5–11.0 |
| magnesium | 0.2–1.0 |
| aluminum | 0.2–1.0 |
| titanium | 0.3–0.6 |
| nickelic oxides | 0.5–1.5 |
| fluorinated polymers | 1.5–3.0 |

They are blended in a mixer to obtain a homogeneous (in terms of its composition) mixture. The produced charge is packed into the lower portion of the metal casing of rectangular cross-section. Then it is covered with the upper portion of the casing after which the edges are rolled-in and the powdered charge is compacted by rolling in rolls. The filling factor of the powder-cored strip electrode, which is the ratio of the mass of the powdered filler to that of the powder-cored strip electrode expressed in per cent, depending on the requisite composition of a composite alloy being applied may range within 71–76.5%.

The thus-produced powder-cored strip electrode is employed for applying composite alloys to parts in low-carbon or low-alloy steels, such as, valves, cups and bells of blast furnace charging arrangements.

According to this invention, in surfacing steel parts with the powder-cored strip electrode, the latter was manipulated in a weaving pattern along the entire width of the layer being applied. Under the above operating conditions the depth of penetration into the base metal, the width and height of the applied composite alloy can be effectively controlled. The preferred surfacing conditions are: welding current magnitude (d.c., reversed polarity) — 450–1200 A; arc voltage — 32–35 V; rate of deposition 3–15 m/hr; electrode weaving rate — 40–150 m/hr.

Insofar as the abrasion resistance of a deposited composite alloy depends not only on the hardness of the strengthening phase — tungsten carbides — but on the strength of a matrix-alloy, the surfaced parts were subjected after machining to heat treatment (aging) by holding them for 24 hrs at a temperature of 400°–500° C. As a result, the hardness of the matrix-alloy increased from 26 to 35 HRC (where HRC is a Rockwell hardness number taken by scale C).

The elements of blast furnace charging arrangement surfaced with composite alloys applied with the powder-cored strip electrode, according to the invention, by following the above-outlined procedure were tested under service conditions in operating blast furnaces. The service life of the valves amounted to about 1 year which corresponds to a 3–4 fold increase as compared with that of similar valves hard faced with Sormite-I.

The bell and the cup of the blast furnace charging device have already been operated within the period characteristic to the parts surfaced with the Sormite-I alloy (1 year) and are still in operation providing normal service conditions of said blast furnace.

Given hereinbelow are particular embodiments of the present invention.

EXAMPLE 1.

A steel part was surfaced with an abrasion-resistant composite alloy by using a powder-cored strip electrode which was made up of a copper casing filled with a powdered charge whose composition was presented in Table I (Example 1).

Surfacing was done on d.c., reversed polarity, 480–500 A, at arc voltage of 33–35 V with the electrode weaving rate of 40 m/hr.

The rate of deposition was 12 m/hr.

The deposited layer had the structure of the composite alloy in which unfused grains of tungsten carbide amounted to 40–45 volume per cent and were dispersed in the bulk of the matrix-alloy whose properties were tabulated in Table I (Examlple 1).

The deposit had no visual cracks, pinholes, slag inclusions. The abrasion resistance of the deposited layer after heat treatment at a temperature of 400°–500° C which lasted 24 hours increased 3 times as compared with that of Sormite-I.

The abrasion resistance was determined under laboratory conditions by the loss in weight of the deposit applied to specimens subjected to gas-abrasive wear in an air stream at a pressure of 2.5 atm.g.p. at a temperature of 400° C. The test lasted 4 hours. Abrasion consumption was 20 kg.

EXAMPLES 2–12.

Steel parts were surfaced with powder-cored strip electrodes under the conditions similar to those described in Example 1. The electrode composition and test results are given in Table 1.

| Example No. | Composition of metal casing, weight per cent | | | | Metal casing, per cent of the weight of powder-cored strip electrode |
|---|---|---|---|---|---|
| | Copper | Nickel | Manganese | Aluminum | |
| I. | 99.2 | 0.2 | 0.3 | 0.3 | 26.4 |
| II. | 80.4 | 19.0 | 0.3 | 0.3 | 26.0 |
| III. | 69.0 | 29.5 | 1.0 | 0.5 | 26.8 |
| IV. | 66.2 | 20.5 | 13.0 | 0.3 | 25.3 |
| V. | 90.7 | 6.5 | 1.0 | 1.8 | 25.9 |
| VI. | 92.8 | 5.5 | 0.5 | 1.2 | 26.2 |
| VII. | 100 | — | — | — | 29.1 |
| VIII. | 81.0 | 19.0 | — | — | 25.0 |
| IX. | 69.5 | 29.5 | 1.0 | — | 27.5 |
| X. | 69.0 | 21.0 | 6.0 | — | 25.5 |
| XI. | 92.5 | 6.0 | — | 1.5 | 25.8 |
| XII. | 92.5 | 6.0 | — | 1.5 | 29.0 |

| Composition of powdered charge, per cent of the weight of powder-cored strip electrode | | | | | | | |
|---|---|---|---|---|---|---|---|
| Tungsten Carbides | Nickel | Manganese | Aluminum | Magnesium | Titanium | Fluorinated polymers | Nickelic oxides |
| 45.0 | 10.5 | 11.0 | 1.0 | 1.0 | 0.6 | 3.0 | 1.5 |
| 61.7 | 0.5 | 8.0 | 0.5 | 0.5 | 0.3 | 2.0 | 0.5 |
| 58.0 | 0.5 | 9.3 | 1.0 | 1.0 | 0.4 | 3.0 | 0.0 |
| 67.0 | 0.3 | 2.5 | 0.5 | 0.5 | 0.4 | 2.5 | 1.0 |
| 70.0 | 0.3 | 0.5 | 0.2 | 0.2 | 0.4 | 2.0 | 0.5 |
| 65.0 | 3.0 | 0.8 | 1.0 | 1.0 | 0.5 | 1.5 | 1.0 |
| 45.0 | 10.5 | 11.0 | 0.7 | 0.7 | — | 1.5 | 1.5 |
| 63.2 | 0.5 | 8.0 | 0.5 | 0.5 | — | 2.3 | 0.0 |
| 57.0 | 0.5 | 9.3 | 1.0 | 1.0 | — | 3.0 | 0.7 |
| 62.3 | 2.2 | 5.0 | 0.5 | 0.5 | — | 2.5 | 1.5 |
| 70.0 | 0.5 | 0.5 | 0.2 | 0.2 | — | 2.3 | 0.5 |
| 62.0 | 3.0 | 0.5 | 1.0 | 1.0 | — | 2.0 | 1.5 |

Table I

| | Properties of composite alloy | | | |
|---|---|---|---|---|
| Volume concentration of tungsten carbides, % | Visible defects | Hardness of matrice-alloy[x] | Relative abrasion resistance[xx] | Plastic properties of matrice alloy[xxx] |
| 40.0 | none | 90 | 3.0 | about 15% |
| 61.0 | " | 98 | 4.0 | " |
| 46.8 | " | 120 | 4.0 | " |
| 52.0 | " | 95 | 3.8 | " |
| 65.0 | " | 98 | 3.1 | " |
| 56.7 | " | 120 | 3.8 | " |
| 40.0 | " | 90 | 3.0 | about 5% |
| 61.0 | " | 98 | 4.0 | " |
| 46.8 | " | 120 | 4.0 | " |
| 52.0 | " | 95 | 3.8 | " |
| 65.0 | " | 98 | 3.1 | " |

Table I-continued

| Volume concentration of tungsten carbides, % | Properties of composite alloy | | | Plastic properties of matrice alloy[xxx] |
|---|---|---|---|---|
| | Visible defects | Hardness of matrice-alloy[x] | Relative abrasion resistance[xx] | |
| 56.7 | " | 120 | 3.8 | " |

[x] Rockwell hardness of matrix-alloy not subjected to heat treatment (scale B – HRB);
[xx] Relative abrasion resistance expressed as a ratio of losses in weight of the composite alloy after heat treatment to that of a standard specimen in Sormite-I alloy;
[xxx] Plastic properties of matrix-alloy include its elongation at 500°.

What we claim is:

1. A powder-cored strip electrode for surfacing with a abrasion-resistant composite alloys, which is made up of a metal casing filled with a powdered charge, with said metal casing being produced from a metal selected from the group consisting of copper, a copper-base alloy containing nickel, a copper-base alloy containing nickel in combination with aluminum, a copper-base alloy containing nickel in combination with manganese, a copper-base alloy containing nickel in combination with aluminum and manganese and the powdered charge comprises the following ingredients taken in weight per cent of the total weight of the powder-cored strip electrode:

| tungsten carbides | 45–70 |
|---|---|
| nickel | 0.3–10.5 |
| manganese | 0.5–11.0 |
| magnesium | 0.2–1.0 |
| aluminum | 0.2–1.0 |
| fluorinated polymers | 1.5–3.0 |

2. A powder-core strip electrode, of claim 1, wherein the powdered charge comprises, apart from the specified components, titanium amounting to 0.3–0.6 weight per cent of the total weight of the powder-cored strip electrode.

3. A powder-cored strip electrode, of claim 1, wherein the powdered charge comprises, apart from the specified components, nickelic oxides amounting to 0.5–1.5 weight per cent of the total weight of the powder-strip electrode.

4. A powder-cored strip electrode of claim 1, wherein the metal casing is made from a copper-base alloy containing 0.2–29.5 weight per cent nickel in combination with the metals selected from the group consisting of aluminum and manganese with aluminum being taken in amounts ranging within 0.3–1.8 weight per cent and manganese within 0.3–13.0 weight per cent.

5. A powder-cored strip elctrode of claim 1, wherein the metal casing is made from a copper-base alloy containing 5.5–6.5 weight per cent nickel in combination with 1.2–1.8 weight per cent aluminum and 0.5–1.0 weight per cent manganese, and the powdered charge comprises the following ingredients taken in weight per cent of the total weight of the powder-cored strip electrode:

| tungsten carbides | 65–70 |
|---|---|
| nickel | 0.3–3.0 |
| manganese | 0.5–0.8 |
| magnesium | 0.2–1.0 |
| aluminum | 0.2–1.0 |
| titanium | 0.4–0.5 |
| fluorinated polymers | 1.5–2.0 |
| nickelic oxides | 0.5–1.0 |

6. A powder-cored strip electrode of claim 1, wherein the metal casing is made from a copper-base alloy comprising 20.5 weight per cent nickel in combination with 0.3 weight per cent aluminum and 13 weight per cent manganese, and the powdered charge contains the following ingredients taken in weight per cent of the total weight of the powder-cored strip electrode:

| tungsten carbides | 67.0 |
|---|---|
| nickel | 0.3 |
| manganese | 2.5 |
| magnesium | 0.5 |
| aluminum | 0.5 |
| titanium | 0.4 |
| fluorinated polymers | 2.5 |
| nickelic oxides | 1.0. |

* * * * *